Patented Apr. 8, 1947

2,418,450

UNITED STATES PATENT OFFICE 2,418,450

FLATTING AGENT

Laszlo Auer, East Orange, N. J., assignor to Interchemical Corporation, New York, N. Y., a corporation of Ohio No Drawing. Application August 14, 1941,
Serial No. 406,926

10 Claims. (Cl. 106—173)

This invention relates to organic flatting agents for use in the preparation of dull coating compositions, and to the compositions and finished articles containing said flatting agents. More particularly, it is directed to the production of an organic flatting agent characterized by unusual compatibility with typical film-forming materials combined, in the preferred form of my invention, with unusual ability to retain flatting power under adverse circumstances.

While many protective and decorative finishes are glossy, it is often desired to obtain finishes which are more or less matte and free from specular reflection, either for the decorative effect (as in furniture finishes) or for the utilitarian effect (as in finishes for photographic devices, where a non-reflecting surface is essential). Such an effect can be obtained by the use of very high percentages of pigment (e. g.—flat wall paints, automobile undercoaters); but it is often undesirable to get the same effect without loading the film with pigment, either because the film properties of a lightly pigmented finish are desired, or because a transparent finish is desired.

To obtain this effect, the coating composition may be designed with an unbalance between the various film-forming ingredients and solvents, so that, on drying, a portion of the film is precipitated while the rest of the materials are still in solution. A very satisfactory flatting effect may be obtained in this fashion, and by careful compounding with certain classes of ingredients, exceedingly tough, transparent dull films are often obtainable. However, the method is not applicable to those classes of film-forming materials which cannot be precipitated and retain toughness of film. Furthermore, even with the best flat finishes of this type, the degree of flatness varies with the drying conditions, and uniform results cannot be obtained unless drying conditions are maintained absolutely uniform. Because of the difficulties involved in maintaining absolutely uniform drying conditions, this type of flat composition is used only in isolated instances.

The trade in general has adopted the use of powders which are relatively insoluble in the coating compositions, and which can be dispersed therein to yield films which are translucent because of the similarity in refractive index between the flatting agents and the film-forming solids, and are flat because of the fact that the insoluble flatting agents break up the light hitting the surface of the film. The flatting agents generally employed fall into two classes: Inorganic transparent inerts, and organic flatting agents.

The common inorganic inerts are siliceous materials, such as infusorial earth, silica, silica gel, some talcs, etc. They are essentially pigments, capable of staying on the surface of coatings while wet and during film formation, and which are transparent because their refractive indices approach those of the vehicles, and are able to produce effective flatting because of the uneven surface and uneven light reflection so formed. They have three principal disadvantages. First, they are never perfectly transparent when a film of very low reflectivity is wanted. Second, they settle very badly to hard dry cakes upon storage which stir in with difficulty. This appears to be a property associated with their particle size and shape. Finally, the films produced are essentially pigmented films, so that where high flexibility is desired, as in artificial leather, the films are unsatisfactory because they craze on flexing.

The common organic flatting agents comprise certain transparent, uncolored heavy metal soaps (magnesium, the alkali earths, zinc and aluminum soaps of fatty acids) and the waxes. These materials generally produce more transparent films than the inorganic flatting agents, since they are more nearly similar in refractive index to the film-forming agents. Furthermore, because of their low specific gravity, and because of their similarity in general constitution to the vehicles, they stay in suspension better, settling into flocculates which are easily stirred back into uniform dispersion. Because of these advantages, they are preferred for transparent interior finishes and the like. They have, however, certain marked disadvantages. While they do not break up a film as badly as the inerts, films containing these agents also show crazing when flexed, as on artificial leather, except in the case of the most soluble soaps, which are extremely difficult to handle. Certain of the soaps hydrolyze when the films are exposed to water, causing an objectionable whitening of the film. Finally, the waxes and soaps are all more or less soluble in hydrocarbon solvents, particularly at elevated temperatures, thereby suffering loss in flatness. Also improper milling, resulting in high temperature, will cause loss of flatting power. These flat materials cannot be used in finishes designed to be dried at elevated temperatures. The metallic soaps of fatty acids are sensitive to humidity and may cause great delay in drying of the films, as well in varnishes as in lacquers.

The films formed in high humidity have a cheesy appearance.

I have invented an organic flatting agent of the metallic soap type which retains the transparency and non-settling characteristics of this type of flatting agent, and at the same time is resistant to hydrolysis, is sufficiently compatible with nitrocellulose films, so that crazing of artificial leather is eliminated, and is considerably less soluble than the ordinary fatty acid soaps used as flatting agents. This new material comprises a soap of rosin which has been modified by the Diels-Alder reaction (as with maleic anhydride) and a heavy metal of the group consisting of the alkali earths, magnesium, zinc and aluminum, in the form of a powder of pigment particle size. Preferably, the powder is coated with an originally water-soluble film-forming material which is insoluble in organic solvents (e. g. methyl cellulose, the film-forming proteins such as albumin, casein, gelatine, etc., water-soluble urea-formaldehyde resins, water-soluble gums such as dextrin, gum tragacanth, gum arabic, etc.) preferably converted to the water-insoluble state after being coated on the soap particles. The coated maleic-rosin soaps are especially useful in finishes which are hardened by baking.

The powdered soap may be dispersed in oil, oleo-resinous, resinous, cellulose derivative, rubber and other film-forming compositions, by the use of ordinary dispersion machinery. The resultant films are more or less flat, depending on the percentage of flatting agent added.

The flatting effect per unit weight compares favorably with that of the ordinary metallic soaps. However, the films are unique in that the toughness of the original glossy film is more nearly approximated than with ordinary soaps. This is particularly noticeable in artificial leathers, where the use of these flatting agents eliminates crazing.

I believe the unusual results obtained are due to the use of rosin, modified by the Diels-Alder synthesis, as a base for my new products. Rosin is miscible with practically all film-forming materials (except where its acidity interferes). The heavy metal soaps of rosin are so affected by the rosin in the molecule that they are readily soluble in the common organic film-forming coating materials and in the common solvents, and cannot be used as flatting agents. Even rosins modified with phenol formaldehyde resin, which are less soluble than rosin itself, yield soaps which are far too soluble to be satisfactory flatting agents. I believe that the maleic anhydride (and similar acids capable of undergoing the Diels-Alder synthesis) modifies the rosin sufficiently so that the solubility is at just the right point to insure the proper film compatibility to prevent crazing, without excessive solubility which will injure the flatting action. It improves simultaneously the light-fastness of films flattened by the new kind of flatting agent.

The rosin may be modified with maleic anhydride, or with other known unsaturated acids having the structure

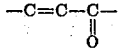

capable of reacting by the Diels-Alder addition reaction with rosin (e. g. fumaric acid, itaconic anhydride and citraconic anhydride). Preferably the rosin is completely reacted with the acid, although incomplete modification may be used where the most insoluble and highest melting point flatting agents are not required. A satisfactory resin was made as follows:

EXAMPLE 1.—BASE RESIN

| | Pounds |
|---|---|
| N wood rosin | 300 |
| Maleic anhydride | 54 |

The materials were placed in a 200-gallon aluminum kettle, and heated to about 200° C. in 30 to 60 minutes. The batch was held at 200° C. for about 30 minutes, raised to 245° C. in about 30 minutes, and held for completion of the reaction for about 30 minutes. The melt was cast at about 180° C., and broken up. The acid number of the resin was 229 and the melting point was 115° C.

The resin was then made into a soluble soap, and precipitated with a salt of a heavy metal. A typical procedure is as follows:

Preparation of flatting agent

Thirty pounds of the base resin were saponified with 9 pounds of sodium hydroxide in 25 gallons of water, at the boil. The solution was then cooled to room temperature. To this cold solution was added a precipitating solution of aluminum sulfate, also cold, made by dissolving 26 pounds of aluminum sulfate in 6½ gallons of water. This was a slight (0.4 pound) excess of aluminum sulfate over theoretical. The two solutions were mixed with constant agitation, adding the aluminum sulfate until the solution was acid to litmus. The mixture was then boiled for ten minutes, filtered, washed and dried at 160° F. (to prevent spontaneous combustion which may occur at higher temperatures). The resultant powdery product was ready for incorporation into a coating composition.

EXAMPLE 2

Example 1 was repeated, by using 36 pounds of maleic anhydride and 300 pounds of rosin, in making the base resin. All reaction conditions were otherwise unchanged. The resulting product was a flatting agent with somewhat higher solubility characteristics in organic solvents than the flatting agent made according to Example 1.

Instead of decreasing the proportion of maleic anhydride to rosin, the same may be also further increased.

EXAMPLE 3

Example 1 was repeated, using the same base resin and only half of the sodium hydroxide solution for the saponification of the full amount of the base resin (30 pounds) and half of the aluminum sulfate. The resulting flatting agent had the same proportion of maleic anhydride to rosin as in Example 1, but the aluminum content of the flatting agent was reduced, thereby decreasing the flatting power and increasing the solubility in organic solvents.

Besides changes in proportions of maleic anhydride, sodium hydroxide and aluminum sulfate to rosin, the products may be further changed by preparing the base resin at different temperatures or in precipitating or aftertreating the aluminum soap of the base resin. Also, the properties may be changed to some extent if another aluminum salt is used for precipitation instead of aluminum sulfate, e. g. aluminum acetate.

Instead of aluminum soaps, zinc soaps or soaps of magnesium and of alkali earth metals may be used.

Example 4

Flat varnishes, lacquers and other coatings may be prepared with flatting agents made according to the present invention. A few examples are given herewith, to show the proportions of flatting agent used to get a film with reduced sheen:

A. Lacquers

| | Per cent by weight |
|---|---|
| Flatting agent | 6 |
| Nitrocellulose | 12 |
| Damar resin | 6 |
| Tricresyl phosphate | 4 |
| Solvent consisting of 60% toluol, 20% ethyl acetate, 10% butyl acetate and 10% butanol | 72 |

B. Varnishes

| | Per cent by weight |
|---|---|
| Flatting agent | 7 |
| 8 gal. long China-wood oil-modified phenolic varnish base | 25 |
| Mineral spirits | 68 |

C. Alkyd-urea varnish

| | Per cent by weight |
|---|---|
| Flatting agent | 7 |
| A glyceryl phthalate resin modified with 35% of soya bean oil | 17½ |
| A butanol-soluble urea-formaldehyde resin | 17½ |
| Solvesso #2 (hydrogenated petroleum naphthas boiling between 135° C. and 177° C.) | 40 |
| Butanol | 10 |
| Xylol | 8 |

The flatting agent used in this formulation was of the coated type because the varnish was to be hardened or dried by baking. I have found that the coated rosin soap flatting agents are superior to the uncoated type for use in finishes which are to be hardened by heat, because the baking temperature adversely affects the insolubility of the uncoated flatting agents.

D. Artificial leather coating

| | Per cent by weight |
|---|---|
| Flatting agent | 7 |
| Five second nitrocellulose | 10.5 |
| Tricresyl phosphate | 13.5 |
| Solvent mixture consisting of ½ ethyl acetate and ½ ethyl alcohol | 69 |

In the preferred form of the invention the modified-rosin soaps are rendered even more insoluble in the usual solvents and vehicles by coating the particles of the soap with a film which is insoluble in organic solvents. As already mentioned, the most satisfactory film-forming materials are of the water-soluble variety, preferably of a type which can be made water-insoluble by after-treatment, such as heating.

An especially useful, water-soluble film-forming material is methyl cellulose, because it can be precipitated from water solution by heating. As a typical example of the use of methyl cellulose, the maleic-rosin aluminum soap of Example 1 was coated by adding 3 pounds of medium viscosity methyl cellulose dissolved in 36 gallons of water (60° F.) to the soap solution resulting from the saponification of the base resin, just prior to precipitation with the aluminum sulfate. The procedure otherwise was identical to that described in Example 1.

An alternative method of coating the soap with the methyl cellulose consisted in adding the methyl cellulose solution to the already precipitated and washed aluminum soap dispersed in an additional 30 gallons of water. The mixture was then brought to a boil for ten minutes, filtered hot and the filter cake dried as described in Example 1.

By either of the above two methods, any of the modified-rosin soaps described may be coated.

The above examples are illustrations of the different embodiments of the present invention, and should not be considered as limiting its scope.

If desired, esters of rosin which are capable of saponification may be substituted for rosin itself in the preparation of these flatting agents. For example, ester gum is a suitable substitute for the rosin.

The incorporation of the flatting agent into the various vehicles may be carried out either by preparing a concentrated paste of the flatting agent in the vehicle or in a solvent mixture, and then diluting the paste by the addition of further vehicle quantities; or the incorporation may be carried out in a single operation by grinding the flatting agent directly into the vehicle in the final proportions. The grinding may be carried out in pebble mills, roller mills, or with the aid of other suitable equipment.

I claim:

1. A composition of matter useful as a flatting agent, which comprises pigment size particles of a modified rosin soap coated with a film-forming substance, said rosin soap consisting of rosin modified by reaction with an unsaturated acid capable of reacting with rosin by the Diels Alder reaction, and a polyvalent metal which produces uncolored soaps which are water-insoluble and transparent in films of conventional varnishes, of the class consisting of aluminum, zinc, magnesium and alkaline earth metals, said film-forming substance being substantially insoluble in organic solvents and originally soluble in water, and forming films from its aqueous solutions.

2. A composition of matter useful as a flatting agent, which comprises pigment size particles of a soap of maleated rosin and a polyvalent metal which produces uncolored soaps which are water-insoluble and transparent in films of conventional varnishes, of the class consisting of aluminum, zinc, magnesium and alkaline earth metals, coated with a film-forming substance, said film-forming substance being substantially insoluble in organic solvents and originally soluble in water, and forming films from its aqueous solutions.

3. A composition of matter useful as a flatting agent, which comprises pigment size particles of a soap of maleated rosin and a polyvalent metal which produces uncolored soaps which are water-insoluble and transparent in films of conventional varnishes, of the class consisting of aluminum, zinc, magnesium and alkaline earth metals, coated with methyl cellulose.

4. A composition of matter useful as a flatting agent, which comprises particles of an aluminum soap of maleated rosin coated with methyl cellulose.

5. A coating composition yielding coatings with reduced sheen or gloss, which comprises a normally glossy drying vehicle and particles of a modified rosin soap consisting of rosin modified by reaction with an unsaturated acid capable of reacting with rosin by the Diels Alder reaction, and a polyvalent metal which produces uncolored soaps which are water-insoluble and transparent in films of conventional varnishes, of the class consisting of aluminum, zinc, magnesium and alkaline earth metals.

6. A coating composition yielding coatings with reduced sheen or gloss, which comprises a normally glossy drying vehicle and particles of an aluminum soap of maleated rosin and a polyvalent metal which produces uncolored soaps which are water-insoluble and transparent in films of conventional varnishes, of the class consisting of aluminum, zinc, magnesium and alkaline earth metals.

7. A coating composition yielding coatings with reduced sheen or gloss, which comprises a normally glossy drying vehicle and particles of an aluminum soap of maleated rosin.

8. A coating composition yielding coatings with reduced sheen or gloss, which comprises a normally glossy drying vehicle and particles of a modified rosin soap coated with a film-forming substance, said rosin soap consisting of rosin modified by reaction with an unsaturated acid capable of reacting with rosin by the Diels Alder reaction and a polyvalent metal which produces uncolored soaps which are water-insoluble and transparent in films of conventional varnishes, of the class consisting of aluminum, zinc, magnesium and alkaline earth metals, said film-forming substance being substantially insoluble in organic solvents and originally soluble in water, and forming films from its aqueous solutions.

9. A coating composition yielding coatings with reduced sheen or gloss, which comprises a normally glossy drying vehicle and particles of a soap of maleated rosin and a polyvalent metal which produces uncolored soaps which are water-insoluble and transparent in films of conventional varnishes, of the class consisting of aluminum, zinc, magnesium and alkaline earth metals, coated with methyl cellulose.

10. A coating composition yielding coatings with reduced sheen or gloss, which comprises a normally glossy drying vehicle and particles of an aluminum soap of maleated rosin coated with methyl cellulose.

LASZLO AUER.

REFERENCES CITED

The following references are of record in the file of this patent:

UNITED STATES PATENTS

| Number | Name | Date |
|---|---|---|
| 2,231,468 | Hanahan | Feb. 11, 1941 |
| 2,169,577 | Bradley | Aug. 15, 1939 |
| 2,063,540 | Ellis | Dec. 8, 1936 |
| 1,939,676 | Ensminger | Dec. 19, 1933 |
| 2,039,243 | Krzikalla | Apr. 28, 1936 |